United States Patent [19]
Bietry et al.

[11] Patent Number: 5,604,639
[45] Date of Patent: Feb. 18, 1997

[54] TWO-ELEMENT OPTICAL SYSTEM AND CAMERA AND METHOD OF MAKING A CAMERA

[75] Inventors: Joseph R. Bietry; Alan E. Lewis, both of Rochester, N.Y.

[73] Assignee: Eastman Kodak Company, Rochester, N.Y.

[21] Appl. No.: 366,660

[22] Filed: Dec. 30, 1994

[51] Int. Cl.$^6$ ............................... G02B 3/02; G02B 9/04; G02B 9/06
[52] U.S. Cl. ..................... 359/717; 359/793; 359/794
[58] Field of Search ..................... 359/793, 794, 359/717

[56] References Cited

U.S. PATENT DOCUMENTS

| | | | |
|---|---|---|---|
| 79,323 | 6/1868 | Dallmeyer | 359/794 |
| 1,776,398 | 9/1930 | Shore | 359/794 |
| 3,006,248 | 10/1961 | Linke | 359/740 |
| 4,932,764 | 6/1990 | Simpson, Jr. | 359/725 |
| 5,000,552 | 3/1991 | Simpson, Jr. et al. | 359/794 |
| 5,067,803 | 11/1991 | Ohno | 359/708 |
| 5,475,536 | 12/1995 | Kikutani | 359/794 |

FOREIGN PATENT DOCUMENTS

| | | |
|---|---|---|
| 0015512 | 7/1986 | Japan . |
| 0073210 | 3/1990 | Japan . |

Primary Examiner—Georgia Y. Epps
Assistant Examiner—Ricky Mack
Attorney, Agent, or Firm—Svetlana Z. Short

[57] ABSTRACT

An optical system comprising two lens elements suitable for use in photographic devices such as single-use cameras having cylindrical image planes. This optical system can operate at F-numbers lower than F/11 while maintaining an excellent performance.

36 Claims, 12 Drawing Sheets

TWO-ELEMENT OPTICAL SYSTEM AND CAMERA AND METHOD OF MAKING A CAMERA

BACKGROUND OF THE INVENTION

1. Field of the Invention

This invention relates to optical systems comprising two elements suitable for use in photographic devices having curved image surfaces.

2. Description of the Prior Art

U.S. Pat. No. 3,006,248 by W. R. Linke (issued in 1961) discloses an objective for cameras having a cylindrical image surface that comprises two meniscus lens elements. The disclosed optical system, "while of the symmetrical type is not completely symmetrical". It is basically a rear landscape lens with a meniscus corrector lens in front. The power of the front lens is weaker than the power of the second lens.

Other proposals have been made for optical systems (or lens systems) including two different asymmetrically located lens elements. For example, U.S. Pat. Nos. 4,932,764 and 5,000,552 disclose a two-element lens system suitable for use in inexpensive cameras, such as single-use cameras. This lens system utilizes two meniscus lens elements arranged around the aperture stop. The lens system is characterized by very good aberration correction, considering that only two lens elements are used.

U.S. Pat. No. 5,067,803 also discloses a two-element lens system for use in photographic cameras. This patent also uses two meniscus lens elements arranged around a central aperture stop.

The two lens element camera objectives are often designed to provide an F/number of F/11. Although it is advantageous to have a faster lens system, that is difficult to accomplish with only two elements.

In addition, the assembly of these types of lens systems is relatively simple, but has one complication. That is, if the lens elements are mounted into two separate cells (or units) with an aperture stop in between, they have to be centered with respect to each other. A badly mounted lens element that is sensitive to decenter will introduce aberrations into the optical system and thus adversely effect the image quality. Therefore, the cells containing the lens elements have to be carefully aligned with each other. This complexity increases manufacturing costs.

Applicants' invention represents a further improvement in two element lens systems.

SUMMARY OF THE INVENTION

An object of the present invention is to produce an improved two-element lens systems with curved image surfaces.

This and other objects of the present invention are met by an optical system, for use in a low-cost camera having an image surface curved toward the optical system, the optical system comprising a shutter and only two single lens elements, wherein $2.0 \geq f_1/f_2 \geq 1.2$, where $f_1$ is the focal length of the front lens element and $f_2$ is the focal length of the rear lens element, the optical system having an F/number below F/11, and the optical system having a curved image corresponding substantially to the curved image surface of the camera through a full field angle of at least 65 degrees.

According to a further aspect of the present invention, a method of making a single-use camera from previously used single-use camera pans comprises the steps of: (A) providing a camera body having a film cassette chamber; (B) supporting in the camera body previously used single-use camera parts including a viewfinder, a shutter mechanism, and an optical system having an F-number in the range $9 \leq F < 11$, and including only two lens elements each of said lens elements having an index of refraction of at least 1.45, one of the lens elements having an aspheric surface, and a shutter located behind the lens elements, and wherein $2.0 \geq f_1/f_2 \geq 1.2$, where $f_1$ is the focal length of the front lens element and $f_2$ is the focal length of the rear lens element; and (C) loading an unexposed roll of film into the film cassette chamber of the camera body.

According to yet another aspect of the present invention, a single-use camera from previously used camera parts comprises: a camera body having a film cassette chamber, the camera body supporting previously used single-use camera parts including an optical system comprising only two lens elements (at least one of them being recyclable), at least one lens element having an aspheric surface on the front surface thereof, wherein $2.0 \geq f_1/f_2 \geq 1.2$, where $f_1$ is the focal length of the front lens element and $f_2$ is the focal length of the rear lens element, and a shutter located behind the lens elements, the optical system being adapted for imaging on a curved film plane; a shutter mechanism, and a viewfinder; and an unexposed roll of film mounted in the film cassette chamber of the camera body.

With the preferred embodiments of the invention, the following and other advantages are realized.

It is an advantage of the disclosed embodiments that the lens system has an improved numerical aperture (i.e. it is a faster lens system).

Another advantage of the disclosed embodiments is that a photographic lens system is extremely simple in construction, is easy to assemble, and yet is capable of taking panoramic photographs.

It is yet another advantage of the embodiments that an optical system (or lens system) is extremely simple in construction, in that a shutter is located behind the lens system, which makes the optical assembly and the recycling of the camera substantially easier to achieve.

Yet another advantage of the disclosed embodiments is that it provides a single-use camera made from previously used single-use camera parts..

Still another advantage of the present invention is that it provides a method of making a single-use camera from previously used camera parts.

BRIEF DESCRIPTION OF THE DRAWINGS

Several embodiments of the present invention would now be described, by way of example, with reference to the accompanying drawings, in which.

DETAILED DESCRIPTION OF THE INVENTION

Figure 1:
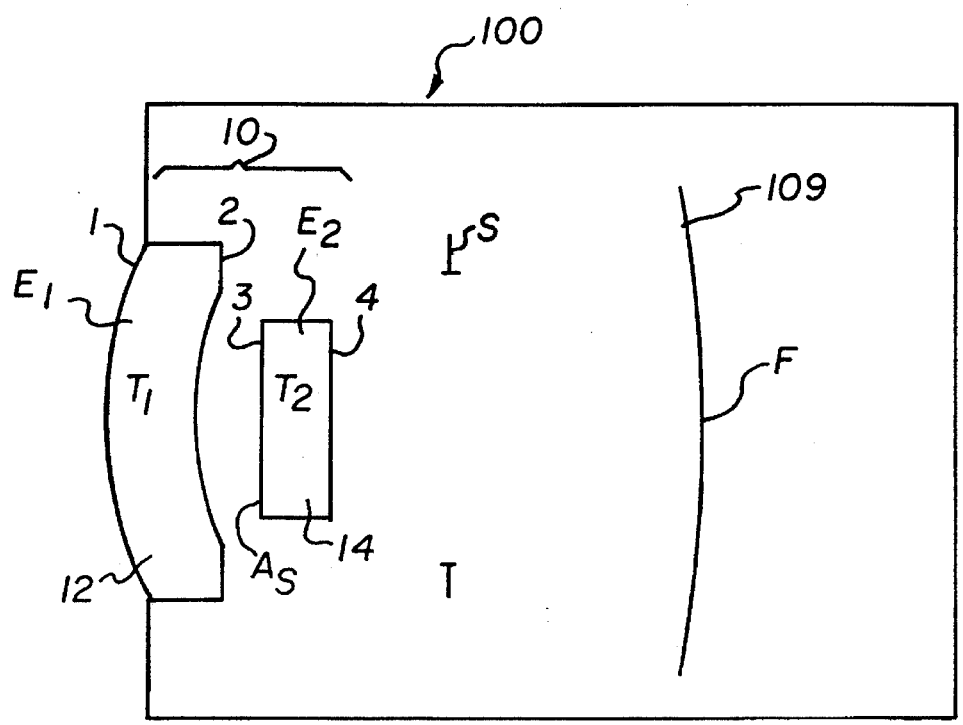
FIG. 1 shows the outline of the lens system 10 of a first preferred embodiment.

The following embodiments of the present invention consist of an optical system (also called a lens system) 10, 10' for an objective or a taking lens 112 imaging an object on a cylindrical image surface coincident with a photographic film frame F of the film 109 for use in an inexpensive camera such as single lens camera 100. The camera 100 includes other known structures or means for advancing the film and a shutter for enabling an exposure of the film frame F to capture an image of the scene to be photographed. The optical system (or the lens system) 10 comprises two different lens components 12 and 14, and a shutter S, disposed between the lens element component 14 and the film frame F. The Photonics Dictionary (1981) defines a shutter as "a mechanical or automatic device used in a camera to control the time in which a light sensitive material is exposed to radiation." This device is usually an aperture hole and a shutter blade which covers and uncovers the aperture. With this type of shutter, if the shutter is located close to the aperture stop location, the exposure on the film is held uniform. As the distance between the shutter and the aperture stop location increases, the exposure across the image becomes non-uniform. Where the focal length of the lens system is about 32 mm (i.e. 30 mm to 35 mm), it is preferred that the distance between the aperture stop and the shutter be about equal or less than 5 mm.

The front lens component 12 of the optical system 10 is a meniscus plastic lens element $E_1$. The rear lens component 14 is a biconvex plastic lens element $E_2$. The front lens component 12 has a longer focal length than the rear lens component 14, in order to retain good aberration control and compactness while expanding a numerical aperture (so that F/#<11) of the optical system. Lens system 10 deviates from a symmetrical type in that the two lens components 12 and 14 are not the typical two meniscus lens elements with concave surfaces facing an aperture stop. More specifically, the rear lens element 14 is a positive biconvex lens element. The aperture stop AS is located between the two lens elements or on one of the internal lens surfaces. In the first embodiment, it is located at surface S3. It is preferred that the ratio of the focal length of the front lens component to the rear lens component be larger than 1.2 and less than 2.0. It is even more preferable that $1.35 \leq f_1/f_2 \leq 1.6$, where $f_1$ is the focal length of the front lens element and $f_2$ is the focal length of the rear lens element. It is even more preferable that $1.40 \leq f_1/f_2 \leq 1.55$.

In the first embodiment, the focal length of optical system 10 is 31.89 mm, the F-number is 9 and the full field of view is 68 degrees. Both of lens elements $E_1$ and $E_2$ are positive and are made from the same type of plastic; therefore, lateral color in lens system 10 is not corrected. It is preferred that the thickness T of the lens elements be 1<T<3 mm. In this embodiment the lens elements $E_1$ and $E_2$ have the thickness of 1.6 mm and 1.2 mm respectively. The focal length $f_1$ of the first lens component 12 is 70.84 mm and the focal length $f_2$ of the second lens component 14 is 50.15 mm. The ratio of $f_1/f_2=1.413$.

This lens system exhibits a telephoto form—i.e. the first principal plane P1 is located in front of the front-most lens surface. The telephoto ratio of the lens system is 0.98 even though it is constructed of two positive power lens elements. This condition is the result of the distribution of power between the two lens elements $E_1$ and $E_2$ (i.e. the above-described $f_1/f_2$ ratio) as well as the function of bendings of the lens elements.

The telephoto ratio is the ratio of the total length TL of the lens system (measuring from the front-most surface's vertex to the image plane) to the effective focal length (EFL) of the lens system. More specifically, the bending of the front lens element contributes to the telephoto effect because, as FIG. 10 indicates, while the front-most lens surface (surface 1) provides positive optical power and brings the axial rays R down, the second lens surface (surface 2) actually brings those rays back up (i.e. providing negative optical power).

The bending of the lens component is defined as a change to the radii of curvature which does not alter the focal length of the lens component. A specific bending parameter X can be defined as $$X = \frac{C_1 + C_2}{C_1 - C_2}$$

where $C_1$ is the vertex curvature of the first surface object side surface of the lens element and $C_2$ is the vertex curvature of the second surface (i.e. the rear or the image side surface). The bending parameter $X_1$ for the front lens component 12 is 62.7. The bending parameter $X_2$ for the second lens component 14 is −0.74.

A two-element lens system such as lens system 10 which exhibits a telephoto form, will be more compact as the telephoto ratio becomes more smaller than 1.0. Thus, from a compactness standpoint, it is desirable to keep this ratio as much less than 1.0 as possible. On the other hand, the smaller that the telephoto ratio is, the worse are the optical aberrations and thus the performance of the lens. Thus, it was found that the designs have to keep the telephoto ratio between 0.95 and 1.0 in order to keep a good optical performance and also compactness.

The image surface of the lens system 10 is cylindrical with a sag in the long dimension of the image. As a result of the increased numerical aperture, best results were achieved when the cylindrical curvature was in the range of 90 mm to 120 mm due to considerations of geometric depth of focus as well as natural Petzval curvature of the lens system.

The aperture stop AS is located on the front surface (surface 3) of the second lens element $E_2$. That is, the front surface of the second lens element $E_2$ acts as an aperture stop. The front surface (surface 1) of the lens element $E_1$ is aspheric. An aspheric surface with about 13 waves departure from the best fit sphere is used on the first surface to control both image quality and distortion. The best fit sphere in this case is a sphere that has a point of tangency with the asphere occurring at 80% of clear aperture. The greatest deviation of this sphere from the asphere at any point within the clear aperture does not exceed 13 waves (where λ=632.8 nm). The use of the aspheric surface and the particular bendings of the lens components (or lens elements) provides the F/9 lens system with the performance equivalent to that of the typical two element F/11 lens system. Surface 4 (the rear surface of lens element $E_2$) acts as a baffle and clips or vignetts the aberrated upper off-axis rays.

The aberration curves illustrating the performance of the optical system of the first preferred embodiment are provided in FIGS. 2A–2E.

Figure 3:
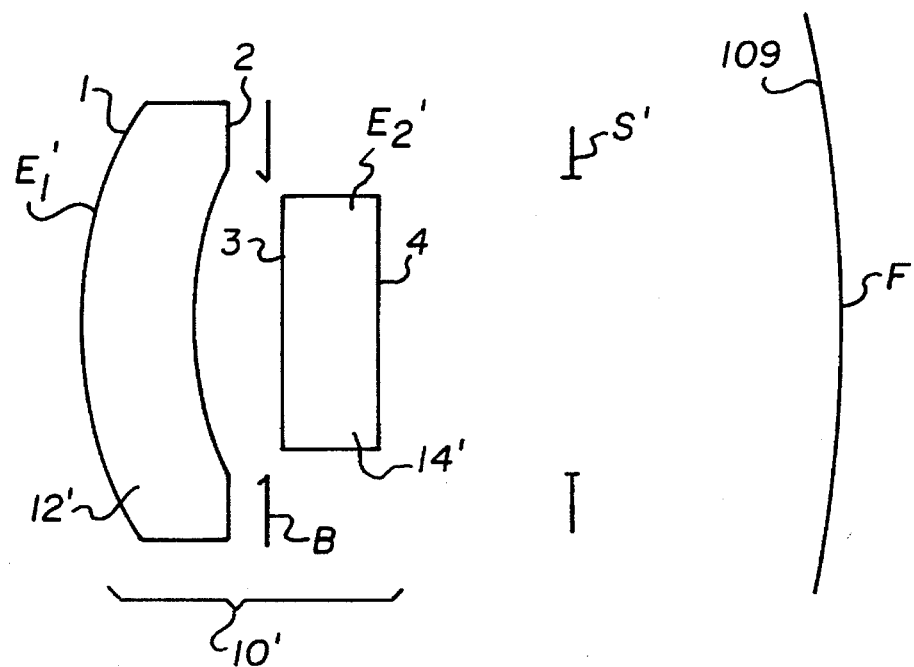
FIG. 3 shows the outline of the lens system 10' of a second preferred embodiment.
Figure 2A:
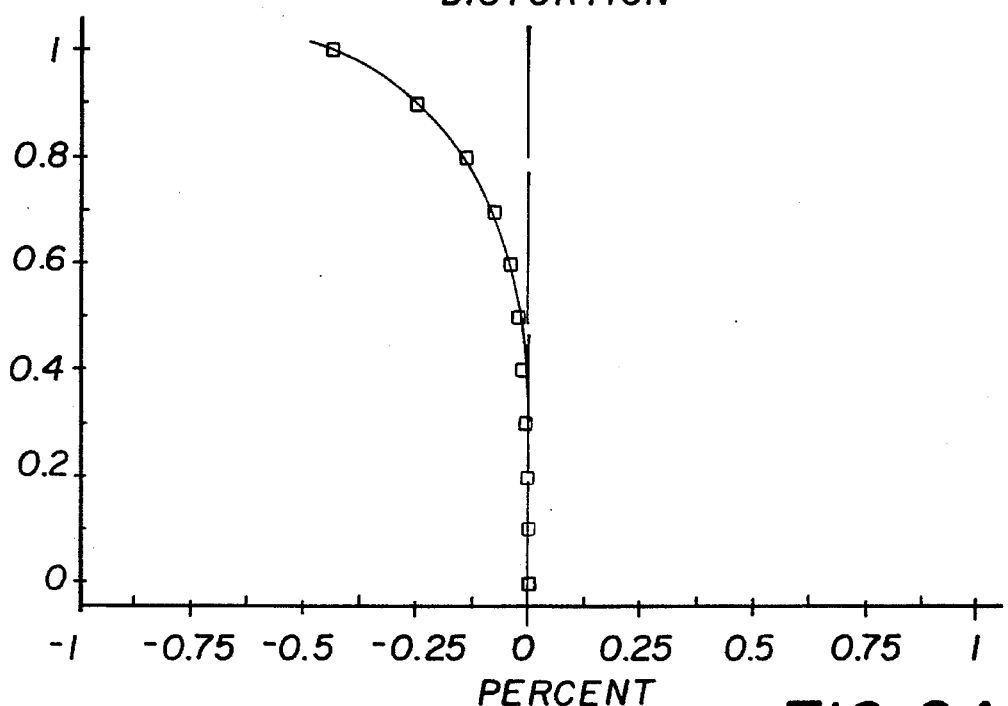
FIGS. 2A–2E provide aberration curves for the lens system 10 illustrated in FIG. 1.
Figure 2B:
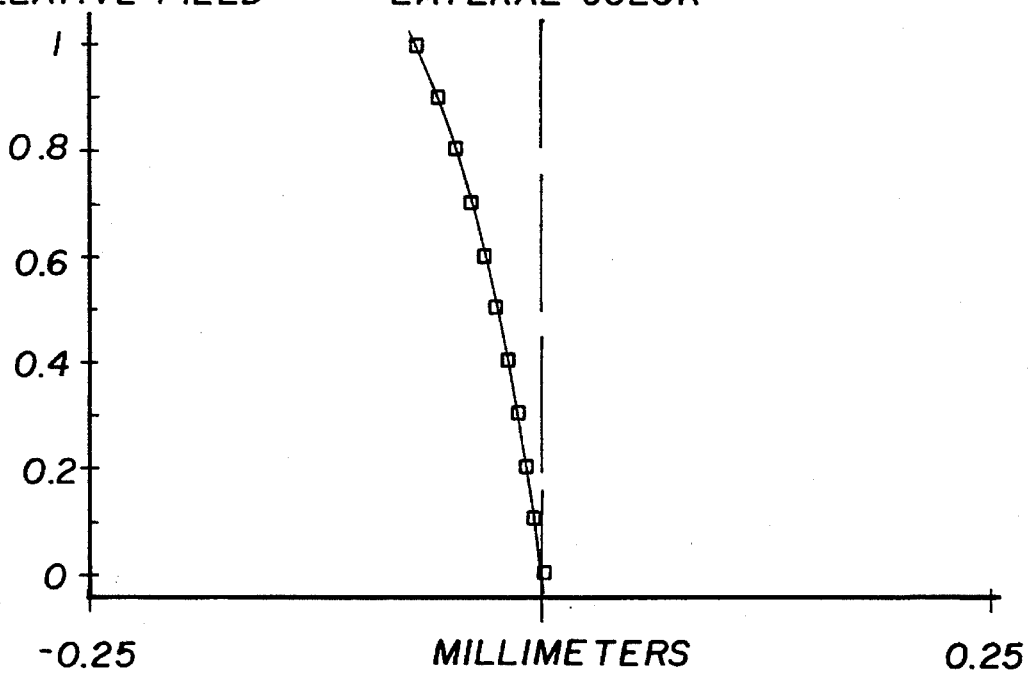
Figure 2C:
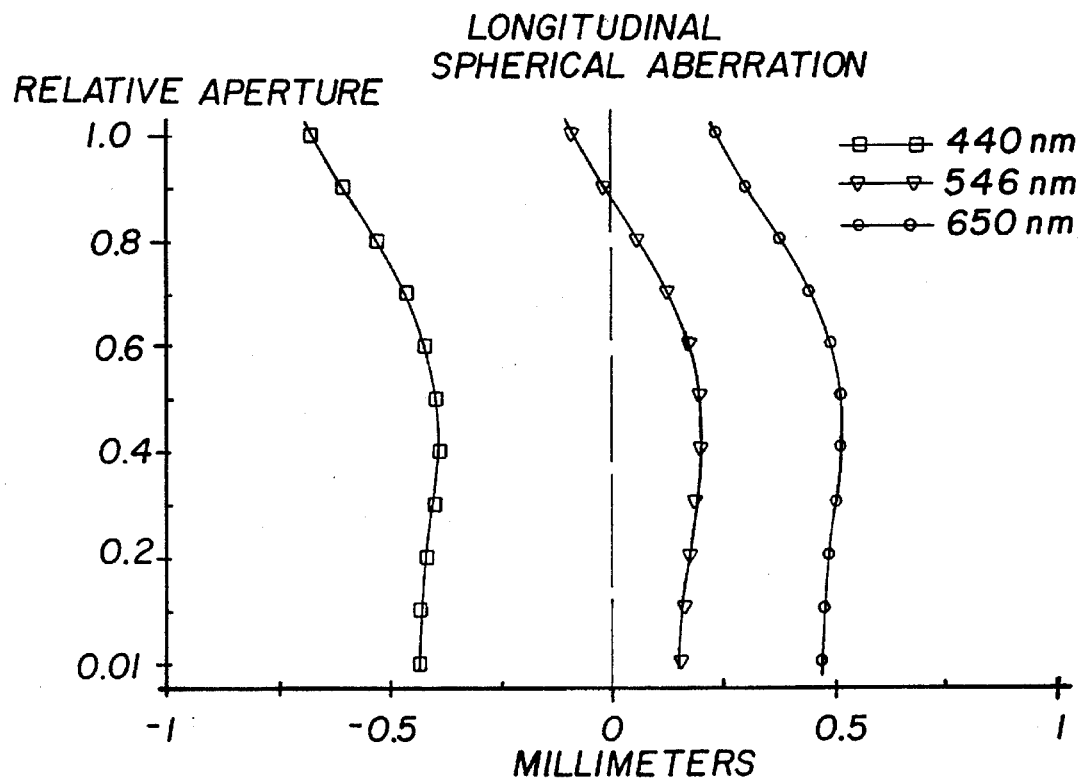
Figure 2D:
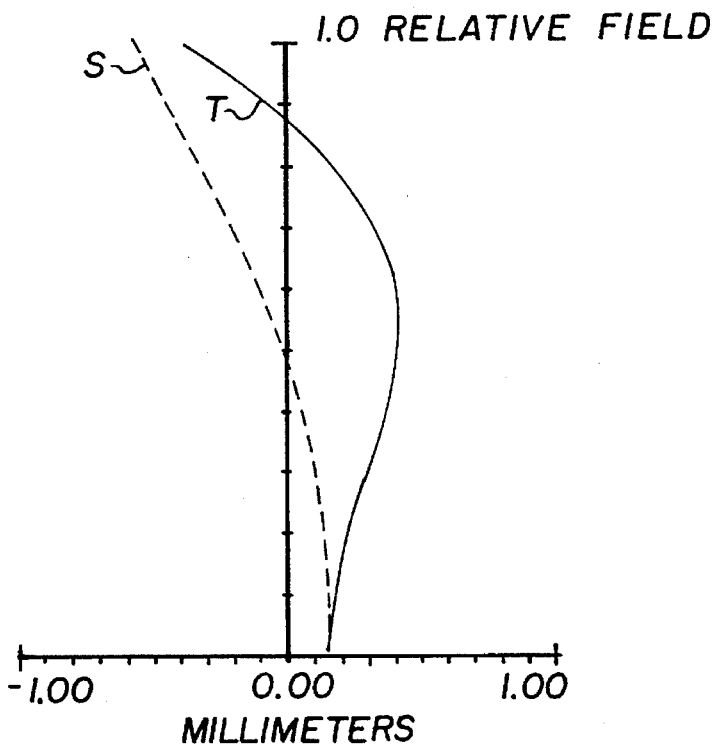
Figure 2E:
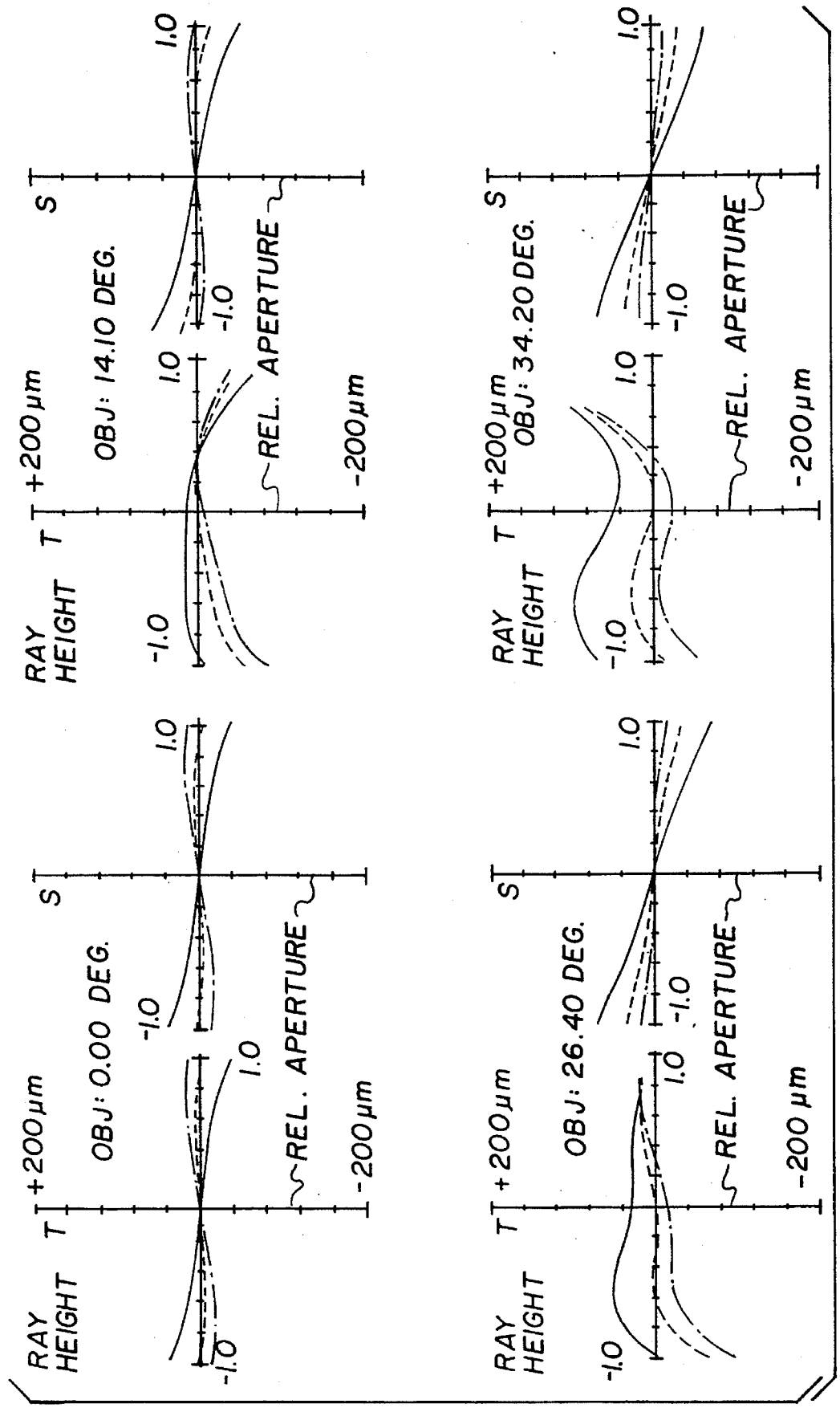
Figure 4A:
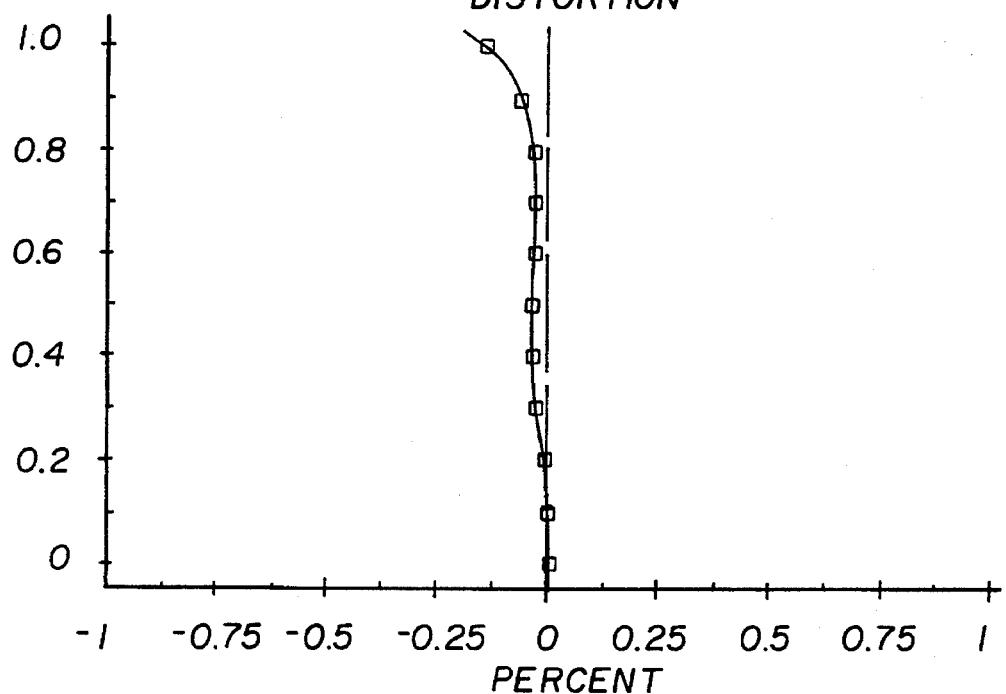
FIGS. 4A–4E provide aberration curves for the lens system 10' illustrated in FIG. 3.
Figure 4B:
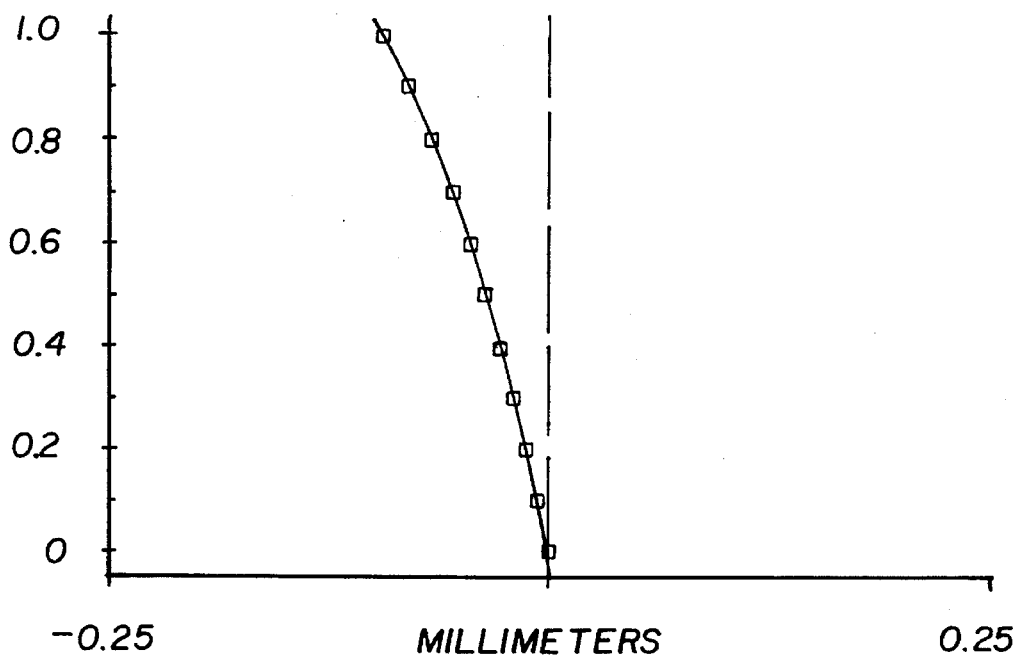
Figure 4C:
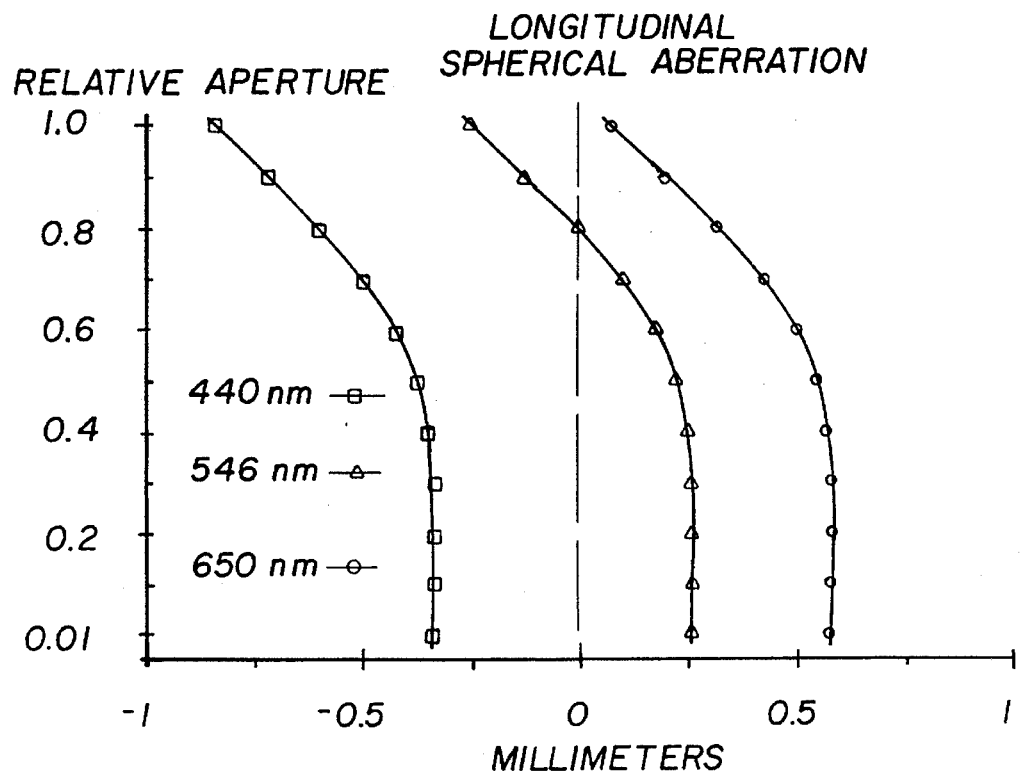
Figure 4E:
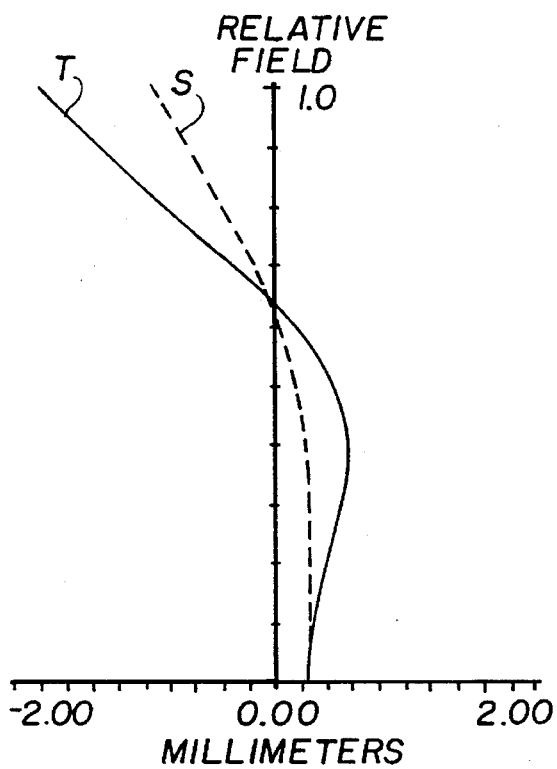

The second preferred embodiment is very similar to the first. It is illustrated in FIG. 3. The optical system 10' of the second embodiment is constructed from two lens components 12' and 14' and an optical shutter S', which is located behind those lens elements.

Figure 10:
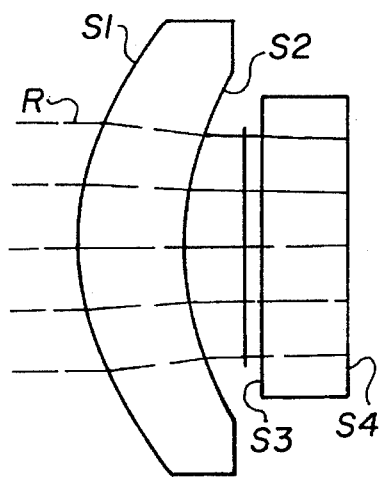
FIG. 10 shows the outline of the lens system 10'. It shows the effects of bending on the axial rays.
Figure 4D:
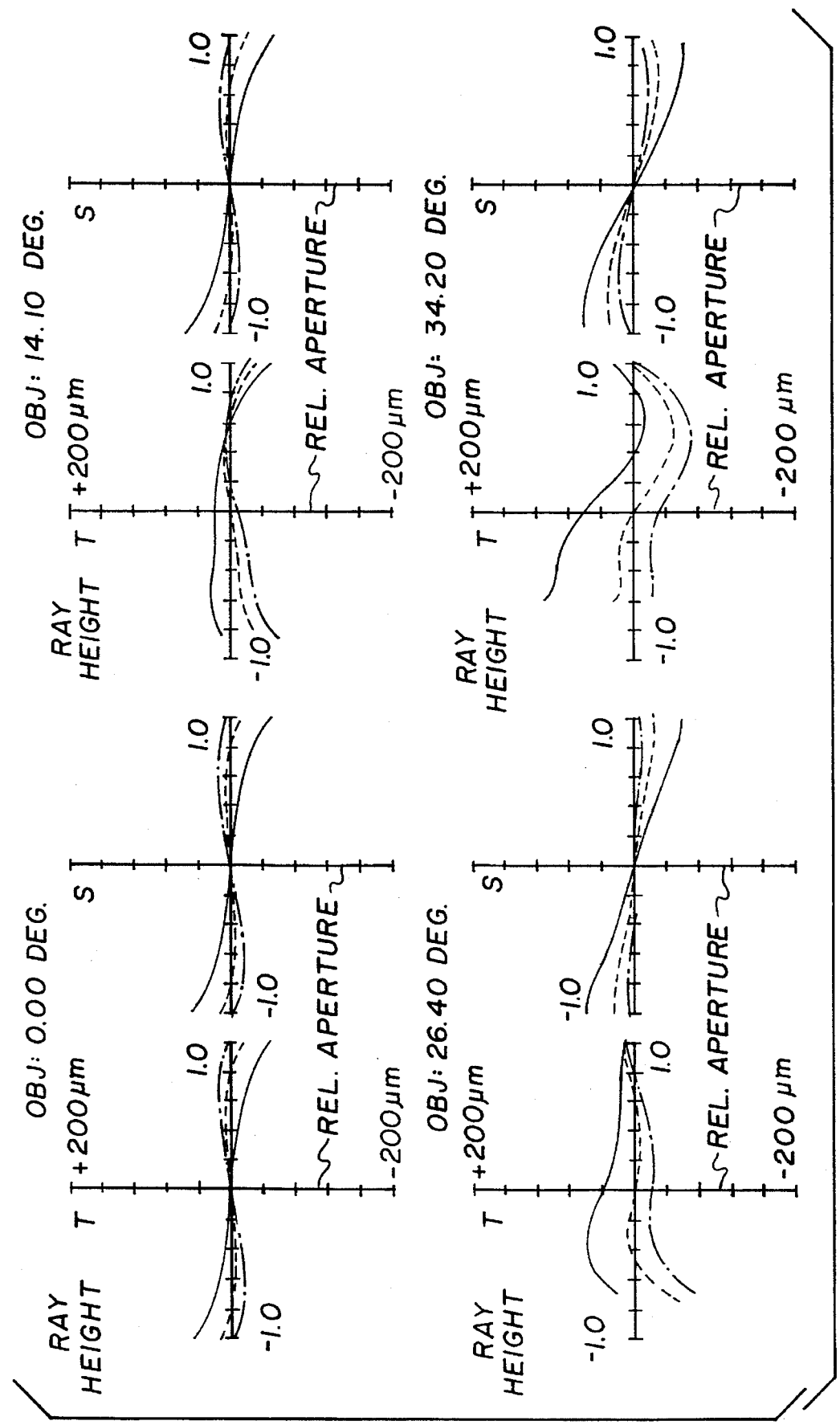
Figure 5:
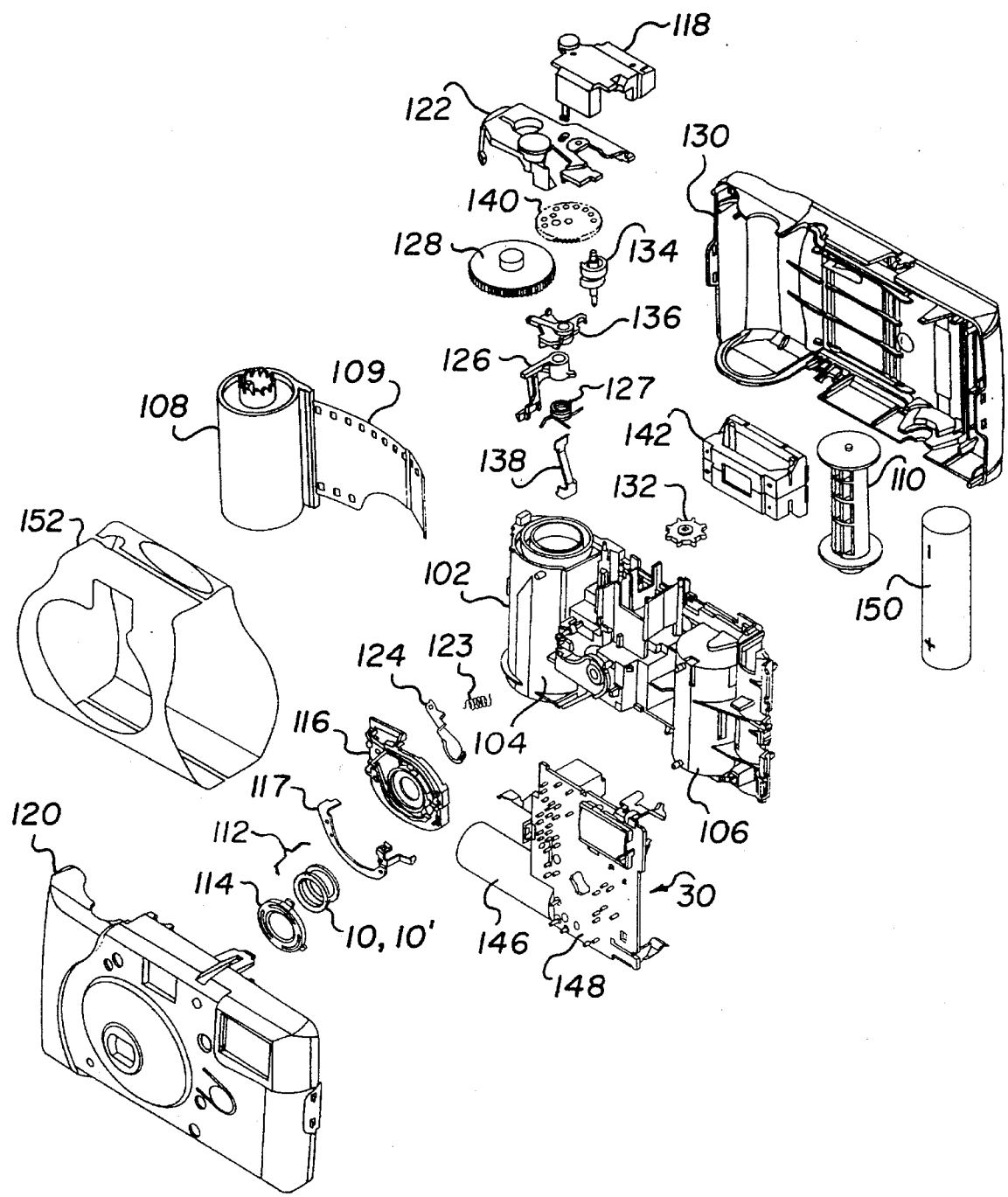
FIG. 5 is an exploded perspective view of a recyclable single-use camera incorporating the lens system 10 or 10'.
Figure 6:
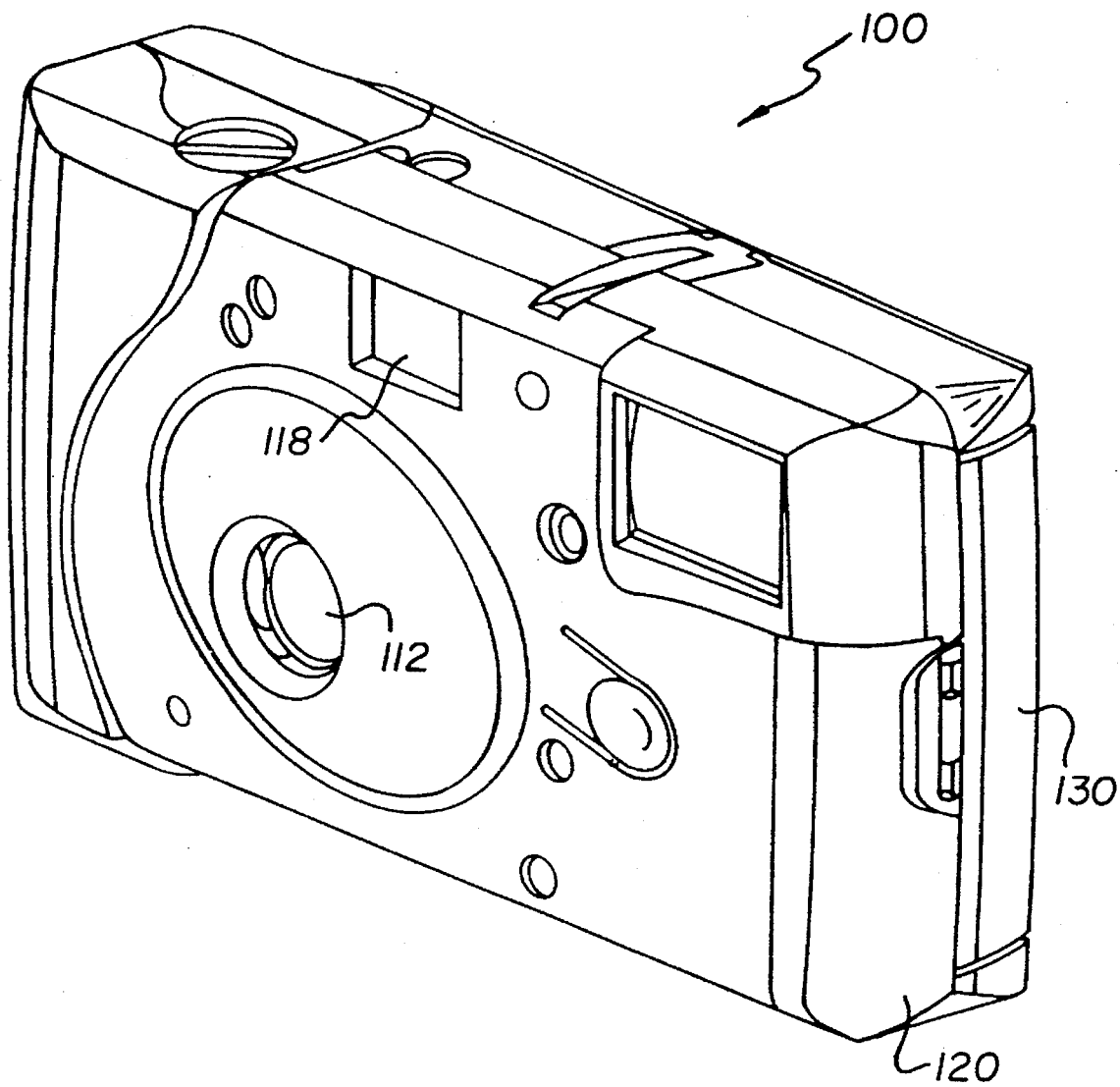
FIG. 6 is a front perspective view of the single-use camera 100 shown in FIGS. 1 and 5.
Figure 7:
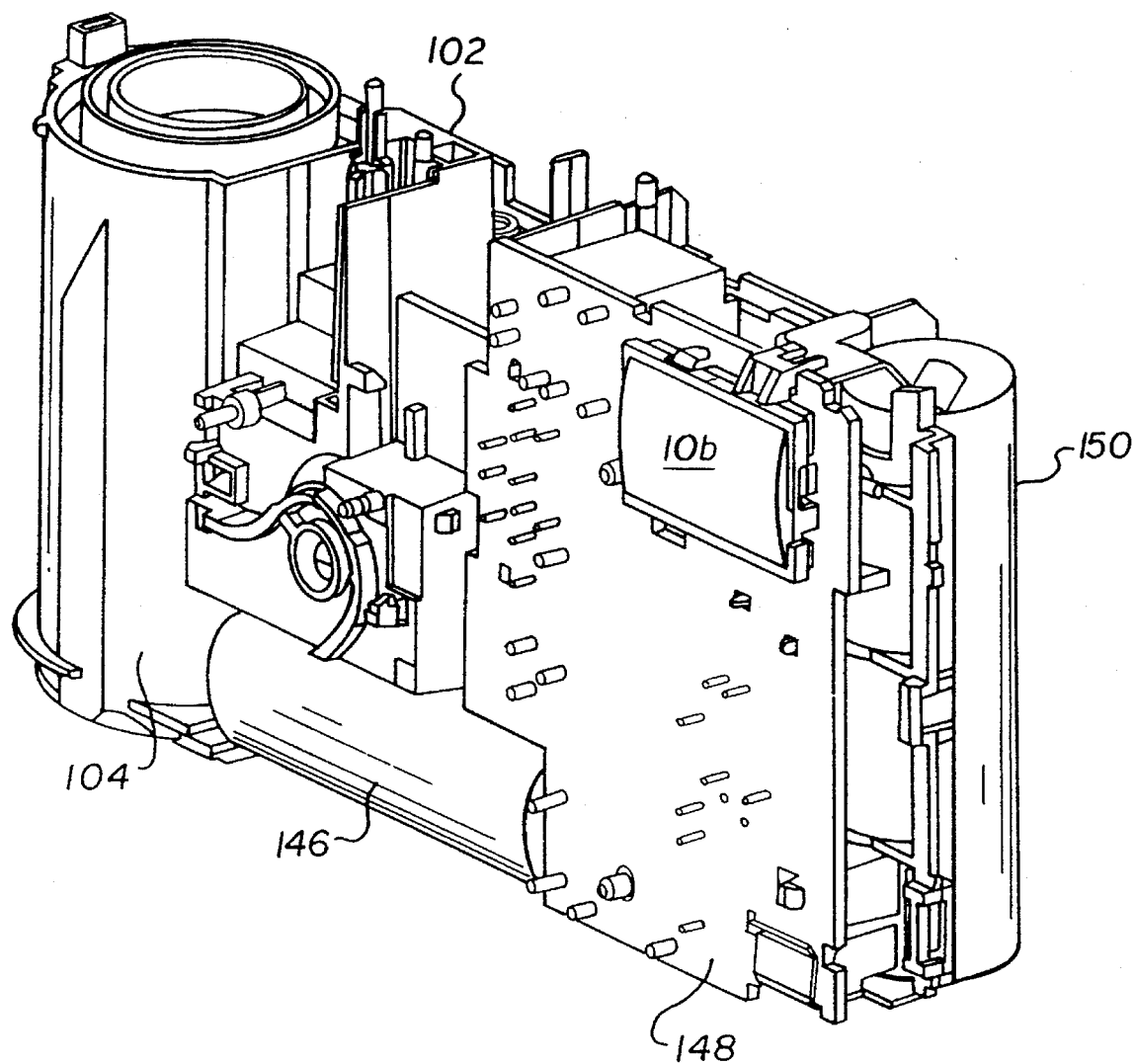
FIG. 7 is a partial front perspective view of the body of the single-use camera shown in FIGS. 5 and 6.
Figure 8:
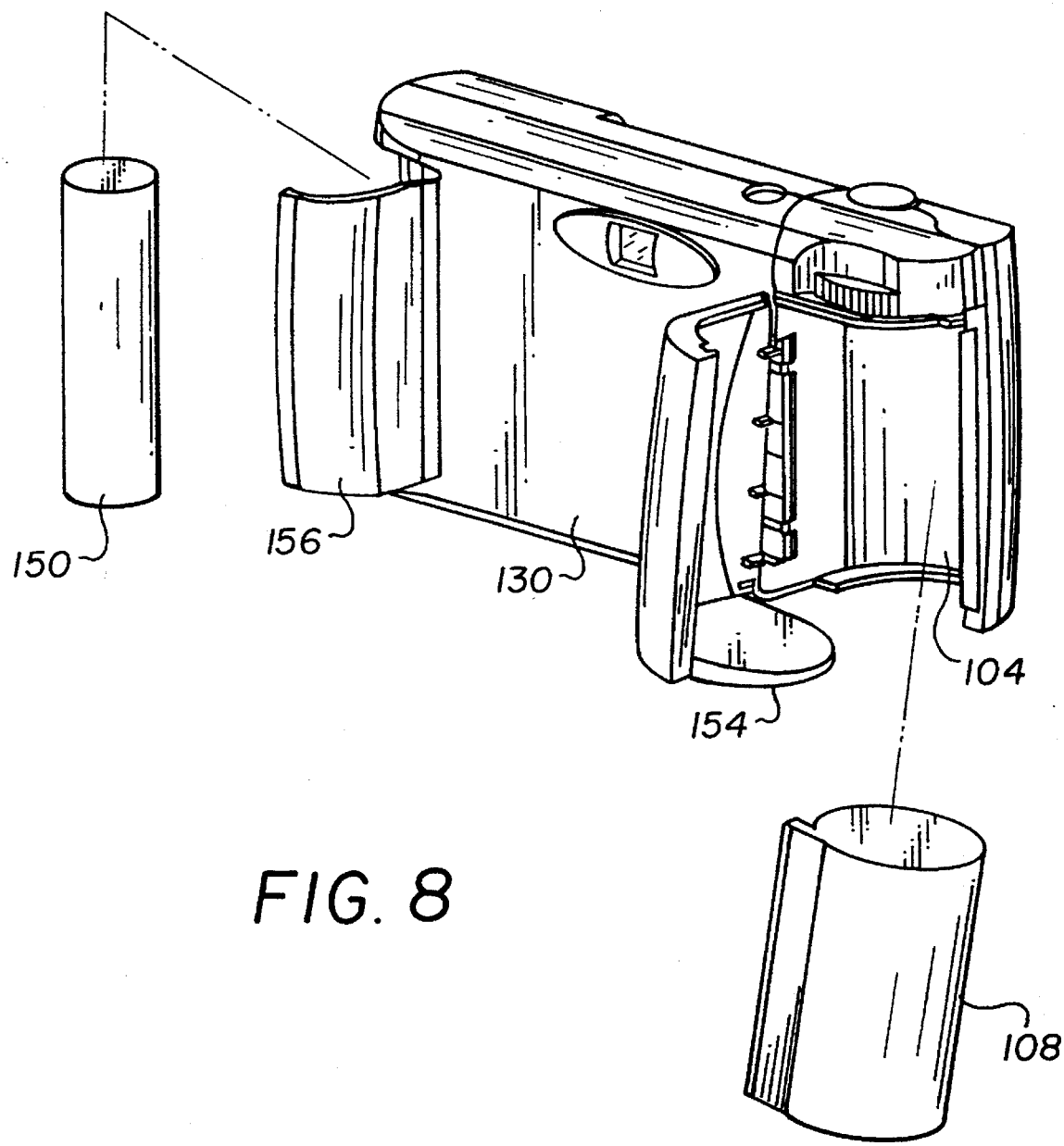
FIG. 8 is a partially exploded rear view of the camera shown in FIGS. 5–7.
Figure 9:
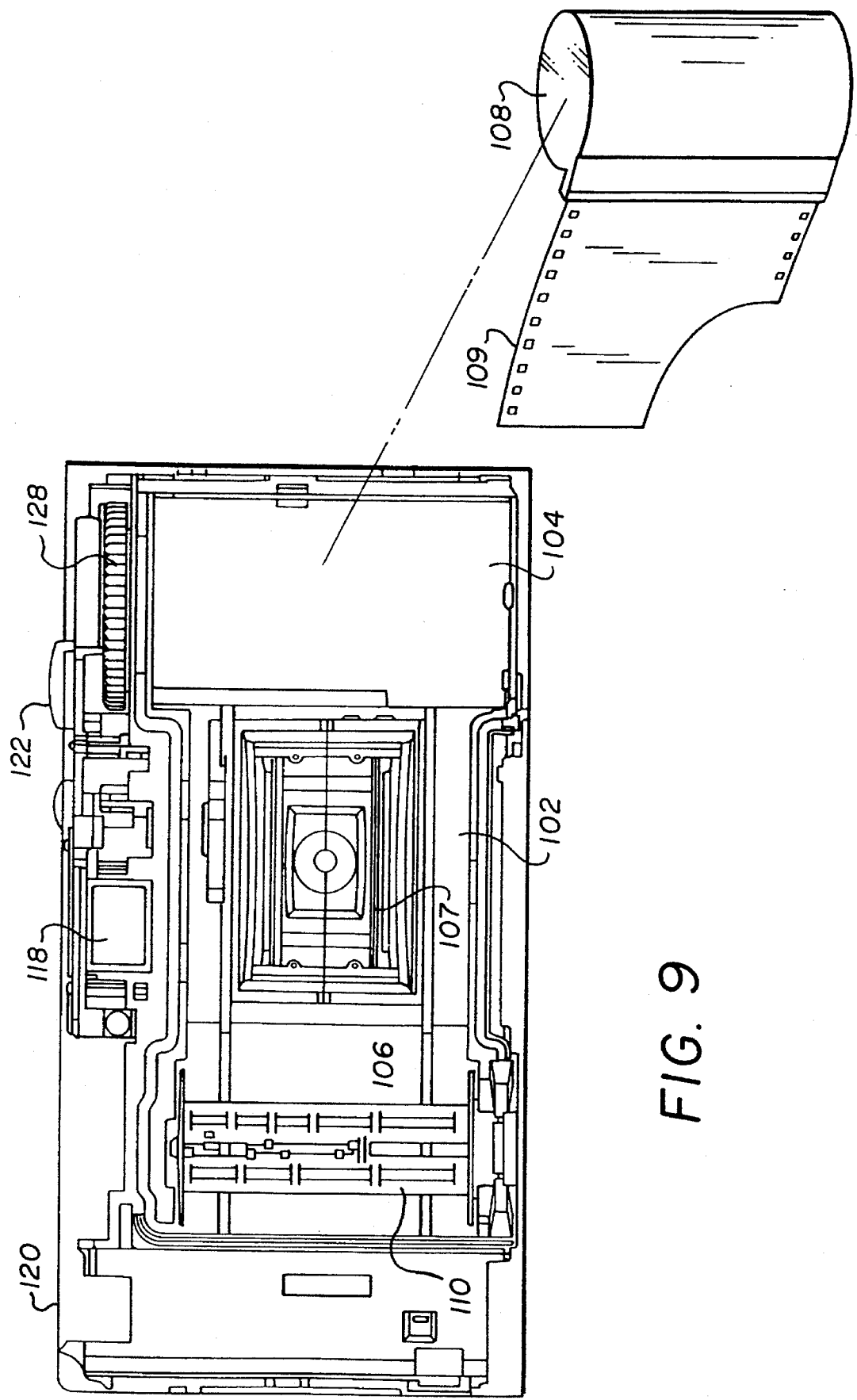
FIG. 9 is a partial rear view of the single-use camera of FIG. 8 showing the reloading of a film cassette.

The front lens 12' is a meniscus plastic lens element $E'_1$. The rear lens component 14' is a biconvex plastic lens element $E'_2$. The front lens component 12' has a longer focal length than the rear lens component 14'. In the second embodiment, the focal length of optical system 10' is 32.08 mm, the F-number is 9 and the full field of view is 68 degrees. Both of lens components 12' and 14' are made from the same type of plastic; therefore, lateral color in lens system 10' is not corrected. The telephoto ratio is also 0.98. Again, although the second lens element contributes most of the optical power to the lens system, it is the shape of the front lens element as well as the respective powers of the two lens elements that create the telephoto effect. FIG. 10 shows how the specific shape of the lens element $E'_1$ helps create a telephoto effect.

The bending parameter $X'_1$ for the front lens component 12' is 106. The bending parameter $X''_1$ for the second lens component $X'_2$ is –0.22. Thus, the bending parameter for the front lens component 12' is larger than the bending parameter for the second lens component 14'.

In this embodiment the lens components 12' and 14' have the thickness of 1.5 mm and 1.3 mm respectively. The focal length $f_1$. of the first lens component 12' is 74.06 mm and the focal length $f_2$. of the second lens component 14' is 49.22 mm. The ratio of $f_1/f_2$=1.51. This embodiment has an internal baffle B. That is, the baffle B is located between the first and the second lens elements. Baffle B serves to vignette aberrated lower rays thereby improving the optical performance of the lens system.

The aberration curves illustrating the performance of the optical system of the second embodiment are provided in FIG. 4A–E.

The following are the numerical examples of embodiments 1 and 2:

TABLE 1

| Surface | Clear Aper. | Radius | Thickness | Index | V Number |
|---|---|---|---|---|---|
| $S1_a$ | 5.72 | ASPHERE | 1.600 | 1.492 | 57.4 |
| $S2_a$ | 4.16 | 4.97420 | 1.100 | | |
| $S3_a$ | 3.12* | 190.834 | 1.200 | 1.492 | 57.4 |
| $S4_a$ | 3.20* | –28.3964 | | | |

Lens Length = 3.900
*Do Not Exceed.
Aspheric Equation:

$$X = \frac{CY^2}{1 + \sqrt{1 - (k+1)C^2Y^2}} + DY^4 + EY^6 + FY^8 + GY^{10}$$

Surf. 1

C = 0.2075550   D = –0.6755400E-03   F = –0.8309000E-05
k = 0.2384700   E = 0.2991300E-04   G = 0.1410900E-06
VERTEX RADIUS (1/C) = 4.81800
Note:
Image surface is a cylinder with radius –120. Long dimension of image format is measured along cylinder radius of curvature.

TABLE 2

| Surface | Clear Aper. | Radius | Thickness | Index | V Number |
|---|---|---|---|---|---|
| $S1_b$ | 5.55 | ASPHERE | 1.500 | 1.492 | 57.4 |
| $S2_b$ | 4.09 | 4.66120 | 0.900 | | |
| | 3.40* | BAFFLE B | 0.200 | | |
| $S3_b$ | 3.28 | 62.3957 | 1.300 | 1.492 | 57.4 |
| $S4_b$ | 3.08* | –39.5408 | | | |

Lens Length = 3.900
*Do Not Exceed.
Aspheric Equation:

$$X = \frac{CY^2}{1 + \sqrt{1 - (k+1)C^2Y^2}} + DY^4 + EY^6 + FY^8 + GY^{10}$$

Surf. 1

C = 0.2186270   D = –0.1152600E-02   F = –0.5084000E-05
k = 0.5986000   E = –0.2636400E-04   G = –0.6225100E-06
VERTEX RADIUS (1/C) = 4.57400
Note:
Image surface is a cylinder with radius –120. Long dimension of image format is measured along cylinder radius of curvature.

Where the radius of curvature for a surface, the axial thickness and air separations are measured in millimeters.

While in the embodiments specifically described above utilize only one aspherical surface, it is to be understood that other embodiments of this invention may have more non-spherical surfaces. It is also to be understood that other embodiments of the present invention may be scaled up or down.

Also, it should be obvious that weak lens components or lens elements which do not significantly alter third order aberration corrections or the like might also be employed, but the term "element" is not intended to include such lens elements or components for purposes of the present application.

Optical systems in accordance with the present invention are particularly well suited for use in cameras which create large aspect ratio images, with the larger dimension of the image area being curved in conformity with the cylindrical image surface. They have an advantage of providing a low F/number, i.e. an F/number below F/11, such as F/9, while maintaining the performance of an F/11 optical system. In addition, because the shutter (S, S') is located behind the lens elements, the lens elements of these optical systems can be assembled as a single unit or a cell and thus simplify the manufacturing process and save the assembly costs. That is, both lens components (12 and 14, 12' and 14') can be snapped together or alternatively placed in a single lens cell, forming a single lens unit. The shutter (or diaphragm) will be placed into the camera body first and the lens cell can be placed into it next. In the event that the lens elements need to be replaced, the lens cell can be replaced without replacing the shutter.

Referring now to FIGS. 5–9, a taking lens 112 or a lens system such as 10 or 10' can be contained within the assemblage of a camera, such as a recyclable single-use camera 100 having three major structural components: a main body or frame 102, a front cover 120 which is attached to the front of the body, and a rear cover 130 which is attached to the rear of the body. Referring to the exploded view of the camera 100 shown in FIG. 5, the body 102 includes a pair of formed chambers 104, 106 for retaining a film cassette 108 and a take-up roll, such as spool 110, respectively. The pair of chambers 104, 106 are oppositely disposed relative to an exposure gate 107, FIG. 9. The body 102 additionally supports the following camera parts which are attached to the body prior to the attachment of the covers 120, 130: the taking lens 112 or the optical system such as lens 10 or 10' which is attached to the front of the body 102 by means of a retainer 114 and a support plate 116 sandwiching the lens therebetween, wherein the support plate has a contact switch 117; and a plastic viewfinder 118. Also attached to the body 102 is a shutter mechanism 119 consisting of a keeper plate 122 having a depressible shutter release portion for tripping a shutter blade 124, biased by a spring 123 via a high-energy lever 126, which is also biased by helical spring 127; a film advancing and metering mechanism consisting of a thumbwheel 128 which engages the spool (not shown) of the loaded film cassette 108, a sprocket 132 for engaging film perforations having a spring biased portion extending into a rotatable cam 134 which engages a metering lever 136 which is biased by means of a spring 138, the cam having an extending portion 138 for contacting a frame counter 140; a light baffle 142 which is mounted into the rear of the body 102 and into the exposure gate 107, FIG. 9; and the flash illumination assembly 30 having an anamorphic lens 10b and further including a capacitor 146 and circuit board 148 which is powered by a battery 150. The illumination assembly 30 is made operable, preferably according to the particular embodiment, by a one touch cantilevered portion of the front cover 120, FIG. 6. The front cover 120 and the rear cover 130 are sandwiched together along with the body 102 to form an assembled camera and a label 152 is subsequently attached to the finished camera 100.

Single-use cameras, such as the described camera 100, are s designed to be recycled by the manufacturer after a purchaser has completed exposing the loaded film and turned the camera over to a photofinisher for development of the film. According to this preferred embodiment, the photofinisher opens a door 154 on the rear cover 130 and removes the film cassette 108. The opening of the door 154 breaks the rear cover 130, but without damaging or exposing the camera parts which are attached to the body 102. Similarly, a second breakaway door 156 can also be provided on the rear cover 130 to be opened by the photofinisher to remove the flash battery 150, if desired. See FIG. 8.

The camera 100 is then turned over to the manufacturer for recycling as will now be described with reference to the FIGS. 5–9. The front cover 120 and rear cover 130 are each broken away from the body 102, each having releasable hooks (not shown) or other attachment means for allowing removal of the covers from the body. The covers, made from a recyclable plastic such as polystyrene, can be sent to be pulverized. In the meantime, an evaluation can be made as to each of the parts supported by the body 102; i.e.: the viewfinder 118, shutter mechanism 119, flash illumination assembly 30, the optical system 10, 10', etc., or the lens elements of the optical system. Those parts deemed worn are removed from the body 102 and replaced. Those remaining single-use parts, such as the optical system 10 or 10' or the lens cell containing these lens elements, such as the front lens elements 14 and 14', the camera flash assembly 30, shutter mechanism 119, etc., which can be reused remain supported by the body 102, for reassembly of a camera 100.

A new front cover 120 is then fitted to the front face of the body 102 and an unexposed roll of film 109 contained within a fresh cassette 108 is loaded into the film cartridge chamber 104. A leading portion of the film 109 contained with the cassette 108 is then engaged with the take-up spool 110, housed within the body chamber 106, as is conventionally known. A new rear cover 130 is then snapped or otherwise attached onto the rear of the camera body 102 and/or to the front cover 120. It should be readily apparent that the covers 120, 130 and body 102 may utilize a number of means for attaching the structural parts together; for example, hook and/or press fitting members may be used, or the parts can be ultrasonically welded together.

In the particular camera 100 described, the film 109 is then pre-wound onto the take-up spool 110 which is supported for rotation in chamber 106 so that the film is wound back into the cassette 108 as the film is being exposed.

The recycled single-use camera 100, utilizing previously used single-use camera pans, such as the flash illumination assembly 30, and the particularly described lens system 10, 10' is now fully assembled and ready for consumer use.

Thus, it is also apparent that the invention provides for making a single-use camera from previously used single-use camera parts utilizing the above-mentioned optical system as a taking lens for such camera.

It is to be understood that the introduction of the aspheric surface is not restricted to the particular examples shown herein, and similar effects may be possible to obtain by providing an aspheric surface at least on one of the four surfaces of the first and second lens element.

Variations and modifications within the scope of the invention will undoubtedly suggest themselves to those skilled in the art. Accordingly, the foregoing description should be taken as illustrative and not in a limiting sense. Thus, the invention has been described in detail with particular reference to a preferred embodiment thereof, but it will be understood that variations and modifications can be effected within the spirit and scope of the invention.

What is claimed is:

1. An optical system for use in a low-cost camera having an image surface curved toward said optical system, said optical system comprising a shutter and only two single lens elements, wherein $2.0 \geq f_1/f_2 \geq 1.2$, where $f_1$ is the focal length of the front lens element and $f_2$ is the focal length of the rear lens element, said optical system having an F/number below F/11, and said optical system having a curved image corresponding substantially to the curved image surface of the camera through a full field angle of at least 65 degrees.

2. An optical system according to claim 1, wherein said shutter is disposed behind said lens elements.

3. An optical system according to claim 1, wherein said two lens elements are plastic lens elements.

4. An optical system according to claim 3, wherein said front lens element has a meniscus shape with a concave surface facing the image surface.

5. An optical system according to claim 1, wherein $1.35 \leq f_1/f_2 \leq 1.6$.

6. An optical system according to claim 4, wherein $1.35 \leq f_1/f_2 \leq 1.6$.

7. An optical system according to claim 1, wherein at least one of said lens elements has an aspheric surface.

8. An optical system according to claim 4, wherein at least one of said lens elements has an aspheric surface.

9. An optical system according to claim 7, wherein said aspheric surface is a front-most surface.

10. An optical system according to claim 8, wherein said aspheric surface is a front-most surface.

11. An optical system according to claim 1 having an internal baffle for vignetting aberrated rays.

12. An optical system according to claim 1, wherein one of the lens surfaces acts as a baffle and vignetts aberrated off-axis rays.

13. An optical system according to claim 1, wherein a front surface of said rear lens element is the location of an aperture stop.

14. An optical system having an image surface curved toward the optical system, said optical system being characterized by aberration correction over a full field angle of at least 65 degrees and an F/number below F/11, said optical system (i) comprising two single element plastic lens elements having the focal length ratio $1.40 \leq f_1/f_2 \leq 1.55$, where $f_1$ is the focal length of the front lens element and $f_2$ is the focal length of the rear lens element, and (ii) a shutter, said shutter being positioned rear-wardly of said two lenses, one of said lenses being a meniscus lens element, said meniscus front lens having a convex front surface and a concave front surface and a convex rear surface.

15. An optical system according to claim 1, wherein one of said lens element is a rear lens element, said rear lens element being a biconvex lens element.

16. An optical system according to claim 4, wherein the other of said lens elements is a rear lens element, said rear lens element being a biconvex lens element.

17. An optical system according to claim 5, wherein the other of said lens elements is a rear lens element, said rear lens element being a biconvex lens element.

18. An optical system according to claim 1, wherein both said front lens element and said rear lens element are made from the same optical plastic.

19. An optical system according to claim 5, wherein both said front lens element and said rear lens element are made from the same optical plastic.

20. An optical system according to claim 14, wherein the index of refraction of both lenses is 1.49 and the Abbe V number is 57.4.

21. An optical system as claimed in claim 5, wherein each lens element fulfills the following two requirements:

$$1\text{mm} < T < 3\text{mm}$$

where T is the center thickness of each of the lens elements.

22. An optical system according to claim 1 which satisfies the following parameters:

| Surface | Clear Aper. | Radius | Thickness | Index | V Number |
|---|---|---|---|---|---|
| S1$_a$ | 5.72 | ASPHERE | 1.600 | 1.492 | 57.4 |
| S2$_a$ | 4.16 | 4.97420 | 1.100 | | |
| S3$_a$ | 3.12 | 190.834 | 1.200 | 1.492 | 57.4 |
| S4$_a$ | 3.20 | −28.3964 | | | |

Lens Length = 3.900
Aspheric Equation:

$$X = \frac{CY^2}{1 + \sqrt{1 - (k+1)C^2Y^2}} + DY^4 + EY^6 + FY^8 + GY^{10}$$

Surf. 1

C = 0.2075550   D = −0.6755400E-03   F = −0.8309000E-05
k = 0.2384700   E = 0.2991300E-04    G = 0.1410900E-06
VERTEX RADIUS (1/C) = 4.81800

23. An optical system according to claim 1 which satisfies the following parameters:

| Surface | Clear Aper. | Radius | Thickness | Index | V Number |
|---|---|---|---|---|---|
| S1$_b$ | 5.55 | ASPHERE | 1.500 | 1.492 | 57.4 |
| S2$_b$ | 4.09 | 4.66120 | 0.900 | | |
| | 3.40 | BAFFLE | 0.200 | | |
| S3$_b$ | 3.28 | 62.3957 | 1.300 | 1.492 | 57.4 |
| S4$_b$ | 3.08 | −39.5408 | | | |

Lens Length = 3.900
Aspheric Equation:

$$X = \frac{CY^2}{1 + \sqrt{1 - (k+1)C^2Y^2}} + DY^4 + EY^6 + FY^8 + GY^{10}$$

Surf. 1

C = 0.2186270   D = −0.1152600E-02   F = −0.5084000E-05
k = 0.5986000   E = −0.2636400E-04   G = −0.6225100E-06
VERTEX RADIUS (1/C) = 4.57400

24. A method of making a single-use camera from previously used camera parts, said method comprising the steps of:

(A) providing a camera body having a film cassette chamber;

(B) supporting in said camera body previously used single-use camera parts including (i) a viewfinder, (ii) a shutter mechanism, and (iii) an optical system having an F-number in the range $9 \leq F < 11$, and (a) including only two lens elements, each of said lens elements having an index of refraction of at least 1.45, one of said lens elements has an aspheric surface, wherein $2.0 \geq f_1/f_2 \geq 1.2$, where $f_1$ is the focal length of the front lens element and $f_2$ is the focal length of the rear lens element, and (b) a shutter located behind such lens element; and (C) loading an unexposed roll of film into the film cassette chamber of the camera body.

25. A single-use camera made from previously used camera parts comprising:

a camera body having a film cassette chamber, said camera body supporting previously used camera parts including an optical system comprised of only two lens elements, at least one of said lens elements having an aspheric surface on the front surface thereof and a shutter located behind said lens elements, wherein $2.0 \geq f_1/f_2 \geq 1.2$ and F#<11, where $f_1$ is the focal length of the front lens element, $f_2$ is the focal length of the rear lens element and F# is the f-number of said optical system, said optical system being adapted for imaging on a curved film plane;

a shutter mechanism, and a viewfinder; and an unexposed roll of film mounted in the film cassette chamber of the camera body.

26. The single-use camera of claim 25, wherein each of said lens elements of said optical system comprises a body of optically transmissive material having an index of refraction at a wavelength approximately in the center of the visible spectral range of at least 1.45, said body having first and second surfaces on opposite sides thereof, said surfaces being curved to provide said optical system with an angular coverage $W \geq 65°$ on a cylindrical film plane.

27. A method of making a single-use camera from previously used single-use camera parts comprising the steps of:

providing a camera body having a film cassette chamber;

supporting in the camera body previously used single-use camera parts including (i) a viewfinder, (ii) a shutter mechanism, and (iii) a taking lens comprising only two lens elements with curved surfaces for providing an F-number in the range $9 \leq F < 11$ and a focal range of 28 to 35 mm, one of said lens elements having an aspheric surface, and a shutter located behind said lens elements, wherein $2.0 \geq f_1/f_2 \geq 1.2$, where $f_1$ is the focal length of the front lens element and $f_2$ is the focal length of the rear lens element.

28. An optical system according to claim 3, wherein one of lens surfaces acts like a baffle and clips or vignetts aberrates off-axis rays.

29. An optical system according to claim 5, wherein one of lens surfaces acts like a baffle and clips or vignetts aberrates off-axis rays.

30. An optical system according to claim 7, wherein one of lens surfaces acts like a baffle and clips or vignetts aberrates off-axis rays.

31. The optical system according to claim 1 further having an internal baffle located between said lens elements.

32. A lens system comprising, from the object side thereof, a first lens element of positive power having a meniscus shape and having a convex surface on the object side; and a second lens element having a biconvex shape, said first and second lens elements having an aspheric surface at least on one of the four lens surfaces thereof and said lens elements satisfying the condition of $1.2 \leq f_1/f_2 \leq 2.0$, where $f_1$ is the focal length of the front lens element and $f_2$ is the focal length of the rear lens element.

33. A lens system according to claim 32, wherein $1.35 \leq f_1/f_2 \leq 2.0$.

34. A lens system according to claim 32, wherein a shutter is disposed behind said lens elements.

35. A lens system according to claim 33, wherein a shutter is disposed behind said lens elements.

36. An optical system for use in a low-cost camera having an image surface curved toward said optical system, said optical system comprising: a shutter and only two single lens elements which are a front lens element and a rear biconvex lens element, wherein $2.0 \geq f_1/f_2 \geq 1.2$, where $f_1$ is the focal length of the front lens element and $f_2$ is the focal length of the rear biconvex lens element, said optical system having an F/number below F/11, and said optical system having a curved image corresponding substantially to the curved image surface of the camera through a full field angle of at least 65 degrees.

* * * * *